Feb. 10, 1942.  E. R. HACMAC  2,272,798
DISPENSING DEVICE FOR CONTAINERS
Filed Oct. 26, 1938
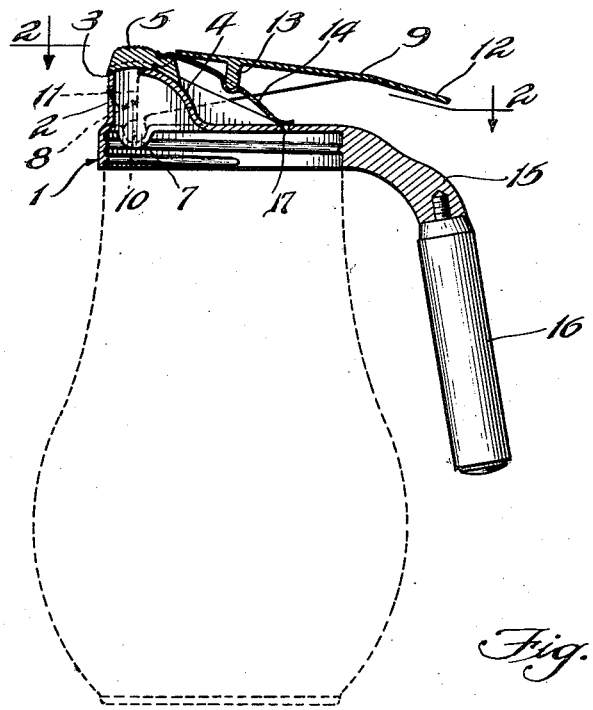
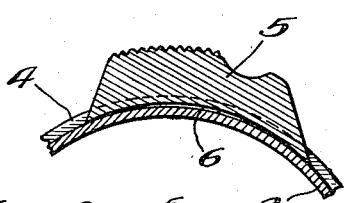
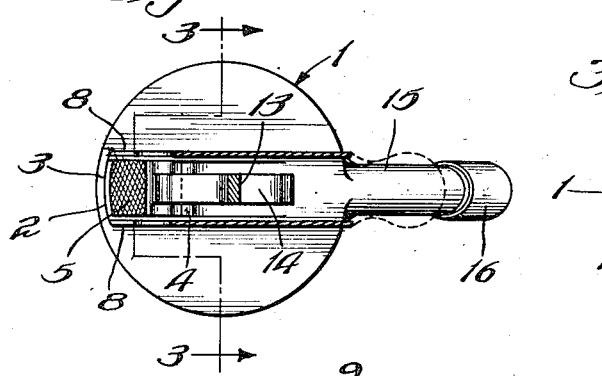
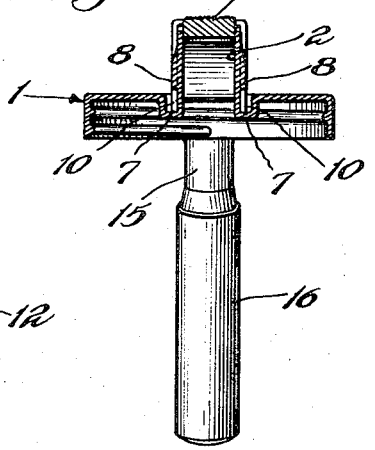
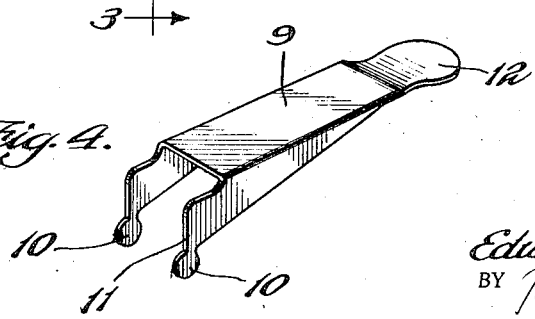
INVENTOR.
Edward Richard Hacmac
BY Parkinson & Lane
ATTORNEY.

Patented Feb. 10, 1942

2,272,798

UNITED STATES PATENT OFFICE 2,272,798

DISPENSING DEVICE FOR CONTAINERS

Edward R. Hacmac, Hollywood, Calif.

Application October 26, 1938, Serial No. 237,015

2 Claims. (Cl. 65—31)

The present invention relates to a dispensing device particularly adapted for viscous liquids.

It is an object of the present invention to provide a novel combined shearing device and container attachment adapted to be readily attached to and detached from a container for efficiently dispensing the contents thereof without dripping, particularly viscous liquids.

It is a further object of my invention to provide a novel shearing device with rigid shearing members, one adapted to rotate with respect to the other in their closing and shearing operation.

It is a further object to provide a dispenser of this class in which the pouring spout extends vertically from the closure and is provided at its upper end with a longitudinally arcuate stationary shearing edge designed to cooperate with a longitudinal arcuate rigid rotated shearing member.

It is a further object to provide a device of this class with but few parts which can be readily taken apart for cleansing and in which the operating lever and all cooperating parts are yieldingly held in operative relation without the use of fixed connections such as screws, rivets, bolts or the like.

The above and other features of advantages and capabilities will become apparent from a detailed description of the accompanying drawing in which I have illustrated one form of my invention but the construction there shown is to be understood as illustrative only and not as defining the limits of my invention.

In the drawing:

Fig. 1 is a sectional view of my improved shearing device showing it attached to a suitable container, the latter being shown in dotted lines;

Fig. 2 is a sectional view taken on the line 2—2 of Fig. 1;

Fig. 3 is a sectional view taken on the line 3—3 of Fig. 2;

Fig. 4 is a perspective view of the operating handle for my device, and

Fig. 5 is an enlarged fragmentary view showing a portion of the longitudinal arcuate shaped stationary shearing member at the upper end of the spout and its cooperating rigid shearing member mounted to rotate thereon.

Referring more particularly to the device shown in the accompanying drawing the closure which forms the body portion 1 is mounted upon a container shown in dotted lines. Any suitable means may be provided for detachably mounting the device on the container such as threads shown on the interior of the closure and complementary threads on the neck of the container. The closure is provided with a vertically extending spout 2 which terminates at its upper end in a longitudinal arcuate stationary shearing member 3. The spout is provided with a countersunk longitudinal arcuate guideway 4. In this countersunk guidway is mounted a rigid shearing member 5 provided with a corresponding longitudinal arcuate shearing face 6 adapted to revolve around the arcuate countersunk guideway and cooperate with the arcuate stationary shearing edge for cutting or shearing the drippings from the spout and to form a tight closure for the spout. The longitudinal arc of the shearing face of the rotatable shearing member is slightly less than the longitudinal arc of the stationary shearing member in the spout as best shown in Fig. 5. This arrangement affords a close, knife-like shearing action at the forward and rearward end of the rotatable shearing member notwithstanding the gradual wear thereon.

The closure is provided with countersunk sockets 7 on each side of the vertical spout. Immediately above these sockets there is integrally provided on each side of the spout stops 8. Rotatably mounted in these sockets is an operating lever or handle 9. The handle 9 is stamped in one piece and is generally U-shaped in cross section terminating at its forward end in substantially circular fulcrums 10 and shoulders 11 adapted to register with the stops 8. The fulcrums 10 are adapted to fit into and cooperate with the sockets in the closure to form a ball and socket connection. The handle 9 at its outer end is provided with a thumb operating member 12. Near the forward end the handle is provided on the under side with a downwardly extending fulcrum 13 registering in a suitable socket of the leaf spring 14. The rearward end of the leaf spring 14 is slightly curved and slidably mounted on the upper surface of the closure 1. The forward end of the leaf spring registers with a groove, as best shown in Fig. 1, in the rigid shearing member 5. In line with the pouring spout, countersunk guideway and operating handle 9 there is formed, preferably integrally with the closure 1, a rearward extension 15 provided with a readily attachable and detachable handle 16.

The various parts may be readily and easily constructed and handled or shipped in knocked-down form and readily and easily assembled and put into operating condition without the use of any screws, nuts, bolts or the like.

Assuming the parts are made as shown in the drawing and it is desired to put them together for operation, the rigid shearing member is placed in the countersunk longitudinal arcuate guideway, the leaf spring is then placed in position with its forward end meshing with the groove or depression in the upper surface of the rigid shearing member and its rearward end resting on the upper surface of the closure 1. The handle is then placed over the leaf spring with its fulcrum 13 meshing with the groove in the spring. Then by pressing downwardly the cylindrical fulcrums 10 on the forward end of the operating lever 9 are snapped into the sockets at the side of the spout and there held in operating relation by the upward pressure of the leaf spring. Thus assembled the device is operated for dispensing liquid by grasping the handle 16 for manipulating the container and by pressing downwardly on the free end of the lever 9 the leaf spring is caused to travel rearwardly thus moving the rigid shearing member rearwardly in its guideway to open the spout. After the user has dispensed the desired amount he releases his thumb from the thumb operated member 12 whereupon it is rotated by means of the leaf spring and thrown to its normal position. Concomitantly therewith the rigid shearing member is rotated forwardly in its countersunk guideway and across the stationary shearing member thus shearing the flow and final drops of the contents being poured. In the forward throw of the operating handle by the leaf spring 14 its forward movement is arrested by the shoulders 11 of the operating handle engaging the stops 8 on the sides of the spout. The closure is provided in its upper surface with a suitable vent 17 which is uncovered during the pouring operation to facilitate pouring but is closed when the parts return to normal position by the rearward end of the leaf spring 14. The upper surface of the rigid shearing member is knurled, as best shown in Fig. 2, to facilitate easy removal. The leaf spring 14 is so arranged and designed as to be self-locking with the other parts when assembled without the use of bolts, screws or the like.

After using the device and it is desired to knock it down for cleaning or other purposes all that is necessary is to press downwardly and rearwardly on the forward end of the operating lever 9 to disengage the fulcrums 10 from their respective sockets. As soon as they have been thus disengaged the lever can be readily removed thus releasing the leaf spring 14 and the shearing member to permit ready and easy cleaning of the parts and replacement and reassembly thereof without the use of any instruments, tools, bolts, nuts, screws or the like.

Having thus described my invention, I claim:

1. A combined cover and flow shearing device adapted for dispensing viscous liquids and having a body member with an upwardly extending dispensing spout provided with a longitudinally arcuate stationary shearing member, said member having sockets and a counter-sunk guideway therein, and a longitudinally arcuate rigid shearing member mounted for rotation in said guideway for closing said spout and shearing the flow therefrom, means for operating said rotatable member, comprising a lever having fulcrums in said sockets and a thumb operating part, and a spring having one end on the stationary member, the other end on the rotatable member and having its middle section in engagement with the lever, the members being maintained in position by the fulcrums in the sockets, the pressure of the handle against the spring normally holding the rotatable member over the spout to close the same.

2. A combined cover and flow shearing device adapted for dispensing viscous liquids and having a body member with an upwardly extending dispensing spout provided with a longitudinally arcuate stationary shearing member having sockets and a counter-sunk guideway therein, and a longitudinally arcuate rigid shearing member mounted for rotation in said guideway for closing said spout and shearing the flow therefrom, means for operating said rotatable member, comprising a lever fulcrumed on the stationary member and a spring between the lever and the members and anchored to the movable member but slidable on the stationary member, the parts being so assembled that the spring will normally force the movable member to close the spout but downward pressure on the lever will cause the spring to slide on the stationary member and move the movable member to open the spout.

EDWARD R. HACMAC.